(12) United States Patent
Hsu

(10) Patent No.: US 7,808,778 B2
(45) Date of Patent: Oct. 5, 2010

(54) EXCHANGE 2.5" TO 3.5" REDUNDANT ARRAY OF INDEPENDENT DISKS MODULE

(75) Inventor: Jeffrey Hsu, San-Chung (TW)

(73) Assignee: Raidon Technology Inc., San-Chung, Taipei (TW)

( * ) Notice: Subject to any disclaimer, the term of this patent is extended or adjusted under 35 U.S.C. 154(b) by 778 days.

(21) Appl. No.: 11/709,885

(22) Filed: Feb. 23, 2007

(65) Prior Publication Data
US 2008/0172527 A1 Jul. 17, 2008

(51) Int. Cl.
*H05K 7/14* (2006.01)

(52) U.S. Cl. ............ 361/679.38; 361/679.33; 361/679.39; 711/114; 312/223.1

(58) Field of Classification Search ............ 361/679.33, 361/679.34, 679.35, 754, 727; 312/223.1, 312/223.2; 711/114
See application file for complete search history.

(56) References Cited

U.S. PATENT DOCUMENTS

| | | | | |
|---|---|---|---|---|
| 5,483,419 A | * | 1/1996 | Kaczeus et al. | 361/679.39 |
| 6,469,900 B2 | * | 10/2002 | Cheng | 361/726 |
| 7,035,097 B2 | * | 4/2006 | Petrov et al. | 361/679.33 |
| 7,035,098 B2 | * | 4/2006 | Huang et al. | 361/679.33 |
| 7,379,294 B2 | * | 5/2008 | Chen | 361/679.33 |

\* cited by examiner

*Primary Examiner*—Jayprakash N Gandhi
*Assistant Examiner*—Ingrid Wright
(74) *Attorney, Agent, or Firm*—Jackson IPG PLLC; Demian K. Jackson

(57) ABSTRACT

A redundant array of independent disks (RAID) module converted from a 2.5-inch specification to a 3.5-inch specification is characterized in that two 2.5-inch SATA hard disks are installed within a standard 3.5-inch SATA RAID module, so as to form a RAID having two hard disks or two stand-alone SATA hard disks for mounting the RAID module including two 2.5-inch hard disks within a 3.5-inch disk drive slot of a common computer housing, or any other devices that can receive a 3.5-inch disk drive.

2 Claims, 5 Drawing Sheets

EXCHANGE 2.5" TO 3.5" REDUNDANT ARRAY OF INDEPENDENT DISKS MODULE

CROSS-REFERENCES TO RELATED APPLICATIONS

Not Applicable

STATEMENT REGARDING FEDERALLY SPONSORED RESEARCH OR DEVELOPMENT

Not Applicable

FIELD OF THE INVENTION

The invention relates to a redundant array of independent disks (RAID) module converted from a 2.5-inch specification to a 3.5-inch specification for being used with a personal computer or other devices, characterized in that two 2.5-inch SATA hard disks are installed within a 3.5-inch SATA RAID module, which has become a standard item of equipment of a computer, and the 3.5-inch converted disk drive having two 2.5-inch hard disks can be mounted within a 3.5-inch disk drive slot of a common computer housing or any other devices which can receive a 3.5-inch disk drive.

BACKGROUND OF THE INVENTION

The existing computer storage media include hard disks, floppy disks, CDs, DVDs, and various memory cards. The hard disks, due to their high stability and capacity, have become necessary storage tools for every personal computer, server, or any other device which needs a digital storage apparatus.

As shown in FIGS. 4 and 5, the computer metal housing 9, which is one of the housings of most personal computers or servers, is equipped with several disk drive slots 91 and 92 for the 5.25-inch and 3.5 inch disk drives. The 5.25-inch disk drive slots 91 provide a space for the user to install a 5.25-inch CD-ROM drive, a 5.25-inch CD burner, or a 3.5-inch replaceable disk drive having a 5.25-inch housing. Furthermore, the 3.5-inch disk drive slot 92 provides a place for the user to selectively install a 3.5-inch hard disk, an 1.44-inch floppy disk drive that meets the requirements of the 3.5-inch specification, or a card reader, etc . . .

Generally speaking, 5.25-inch and 3.5-inch are the major specifications for the disk drives installed within the bodies of computers, wherein a 5.25-inch hard disk is mounted at the inside of the 5.25-inch disk drive slot. However, over the years, manufactures of the 5.25-inch hard disks are declining out gradually. Therefore, the space for the 5.25-inch disk drive is rarely to be used, or it is occupied by a 3.5-inch hard disk with an adapting frame. On the other hand, a 3.5-inch hard disk or a 2.5-inch hard disk can be mounted within the 3.5-inch disk drive slot.

Conventionally, only a 5.25-inch hard disk and a 3.5-inch or 2.5-inch hard disk are mounted within a 5.25-inch disk drive slot and a 3.5-inch disk drive slot hard disk respectively. Therefore, for a single 5.25-inch disk drive and a single 3.5-inch disk drive, an disk-array form of data backup is impossible, and the installation of two hard disks in a disk drive slot is also impossible. It is obvious that the utilization of the conventional 3.5-inch disk drive is seriously limited.

The design concept of the invention is to install two 2.5-inch hard disks within a 3.5-inch RAID module without changing the original structure of the computer housing and the disk drive slots, and to fix the 3.5-inch RAID module having two 2.5-inch hard drives within the 3.5-inch disk drive slot or the floppy disk slot. The concept of the invention can also be applied to any external devices or other apparatus which can be mounted therein with a 3.5-inch SATA hard disk. The concept is valuable with regard to safe data backup and the practicability.

SUMMARY OF THE INVENTION

The present invention provides a redundant array of independent disks (RAID) module converted from 2.5-inch to 3.5-inch, which is characterized in that two 2.5-inch SATA hard disks are installed within a standard 3.5-inch SATA RAID module so as to form a RAID having two hard disks or two stand-alone SATA hard disks for mounting the RAID module including two 2.5-inch hard disks within a 3.5-inch disk drive slot of a common computer housing or any other devices which can receive a 3.5-inch disk drive.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
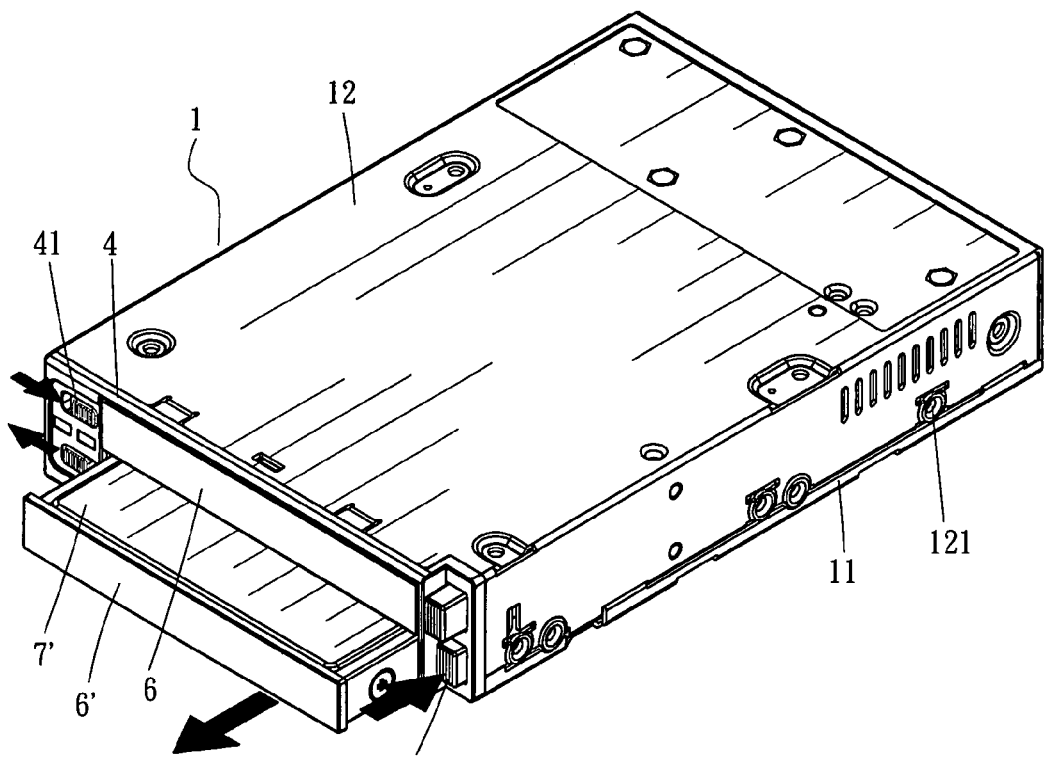
FIG. 1 is a perspective view of a preferred embodiment according to the present invention.
Figure 2:
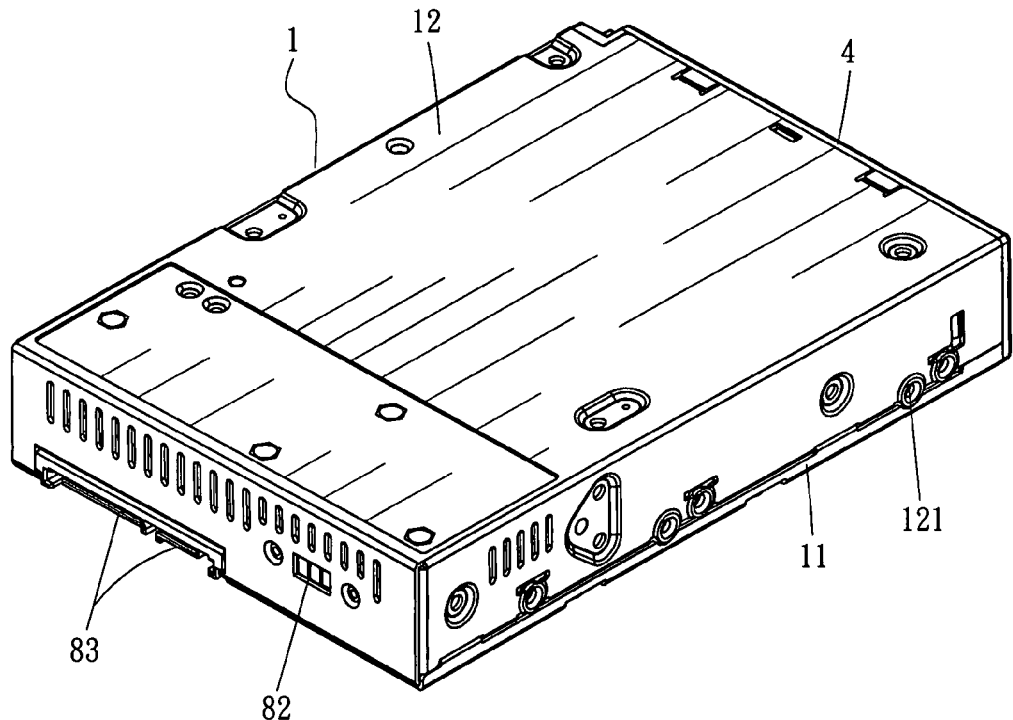
FIG. 2 is a perspective view of the preferred embodiment of FIG. 1 from in another viewpoint.
Figure 3:
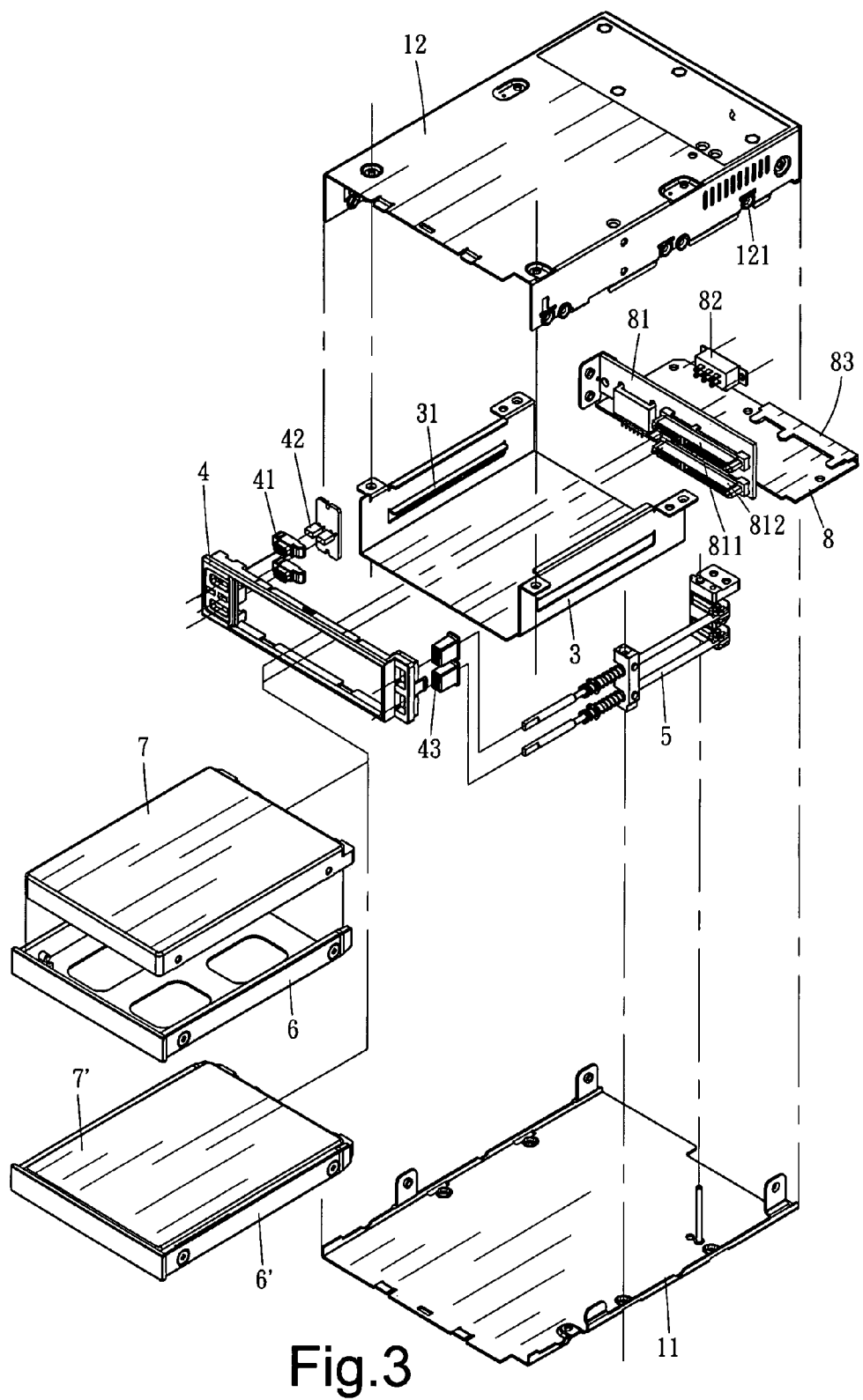
FIG. 3 is an exploded view of the main structure according to the present invention.

As shown in FIGS. 1, 2, and 3, the RAID module converted from a 2.5-inch specification to a 3.5-inch specification according to the invention is characterized in that two 2.5-inch hard disks 7 and 7' are installed within a 3.5-inch SATA RAID module 1 which has already become a standard equipment item of the personal computer. Therefore, a wider or more flexible application for data storage is provided.

Accordingly, in the RAID module converted from a 2.5-inch specification to a 3.5-inch specification according to the invention, the 3.5-inch RAID module 1 can be used as a disk array that is made up of the two 2.5-inch hard disks 7 and 7', or serves as two stand-alone SATA hard disks.

The invention can be brought into practice by fixing a 3.5-inch SATA RAID module having two 2.5-inch SATA hard disks 7 and 7' within a standard 3.5-inch disk drive slot of a common computer housing or any external devices or other apparatus capable of receiving a 3.5-inch disk drive.

Please refer to FIGS. 1, 2, and 3. A RAID module converted from a 2.5-inch specification to a 3.5-inch specification according to the invention is illustrated. The structure of the 3.5-inch RAID module 1 mainly includes a base 11, a cover 12, a hard disk slideway 3, a panel 4, a push rod module 5, two hard disk holders 6, two 2.5-inch hard disks 7 and 7', and a control board 8.

A slideway 31 is disposed on the inner side of the hard disk slideway base 3 for the two hard disk holders 6 and 6' to slide into fixed positions. The 2.5-inch hard disks 7 and 7' can be fixed on the hard disk holders 6 and 6' respectively. The control board 8 is mounted on the end portion of the hard disk holder 6. The printed circuit board (PCB) 81 is further connected to the control board 8. The array mirror storage setting key 82 and the SATA adapter 83 are mounted on the end portion of the control board 8.

The hard disk connectors 811 and 812 are installed on the above-mentioned PCB 81 to be connected to the terminals on the end portions of the 2.5-inch hard disks 7 and 7'.

A panel 4 is fixed on the front edge of the hard disk slideway base 3. A lock key 41 and an indicator lamp 42 are mounted on one side of the panel 4, and a push rod button is set on the other side of the panel. The push rod button 43 is connected with a push rod module 5 fixed on a corresponding position of the hard disk slideway base 3.

Figure 4:
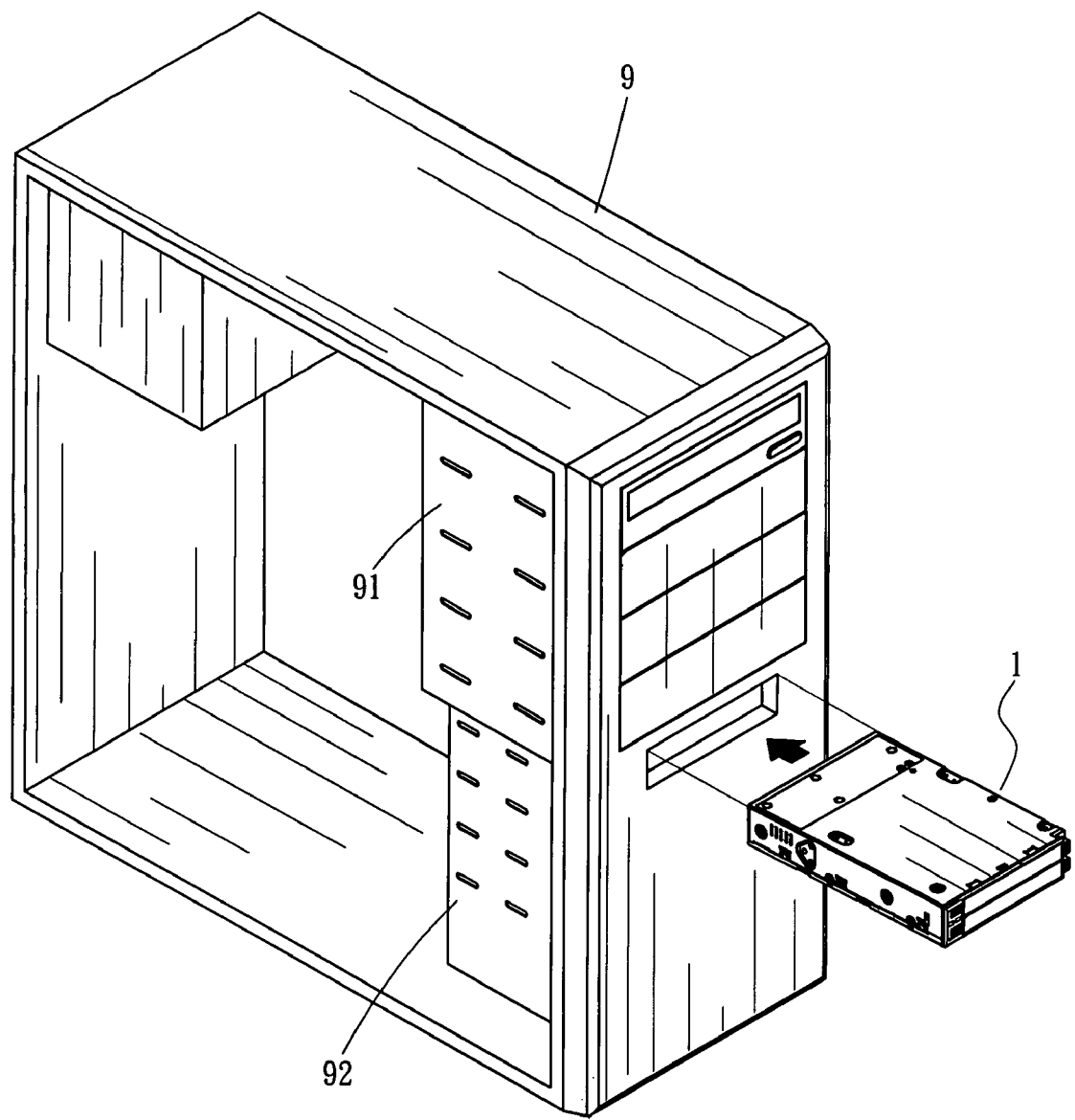
FIG. 4 is a perspective view schematically illustrating an installation of an embodiment of the present invention in an 1.44-inch floppy disk slot of a computer.
Figure 5:
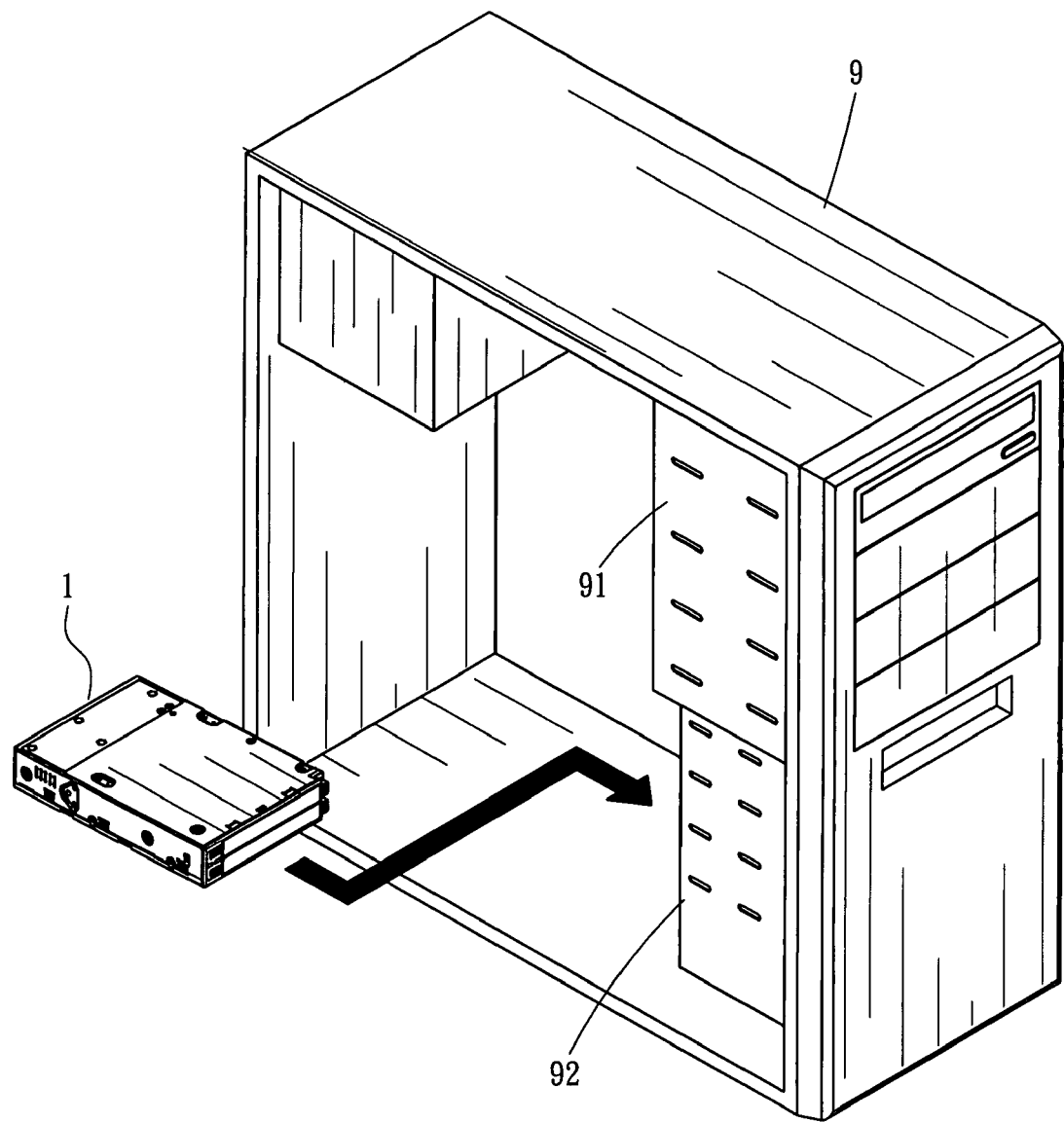
FIG. 5 is a perspective view schematically illustrating an installation of an embodiment of the present invention in a 3.5-inch floppy disk slot of a computer.

When the cover 12 is closed, it results in a complete RAID module 1 converted from a 2.5-inch specification to a 3.5-inch specification. Please refer to FIGS. 2, 4, and 5. Standard disk screw holes 121 are reserved on the lateral sides of the cover 12. In combination with the exposed SATA adapter 83, the 3.5-inch SATA RAID module 1 of the invention can be fixed on any other computer systems or other digital multimedia devices which are capable of receiving a 3.5-inch SATA hard disk. Furthermore, according to the exposed array mirror storage switch 82, it is possible to switch the operation mode between a disk array mode and a two stand-alone hard disks mode.

In the structure of the RAID module 1 converted from a 2.5-inch specification to a 3.5-inch specification according to the invention, lock keys 41 and push rod buttons 43 are respectively set on the two sides of the hard disk slideway base 3 and the panel 4, which provide locking mechanisms for the hard disk holders 6 and 6', and the hard disk holders 6 and 6' can be pushed out through the use of the push rod buttons 43.

Figure 6:
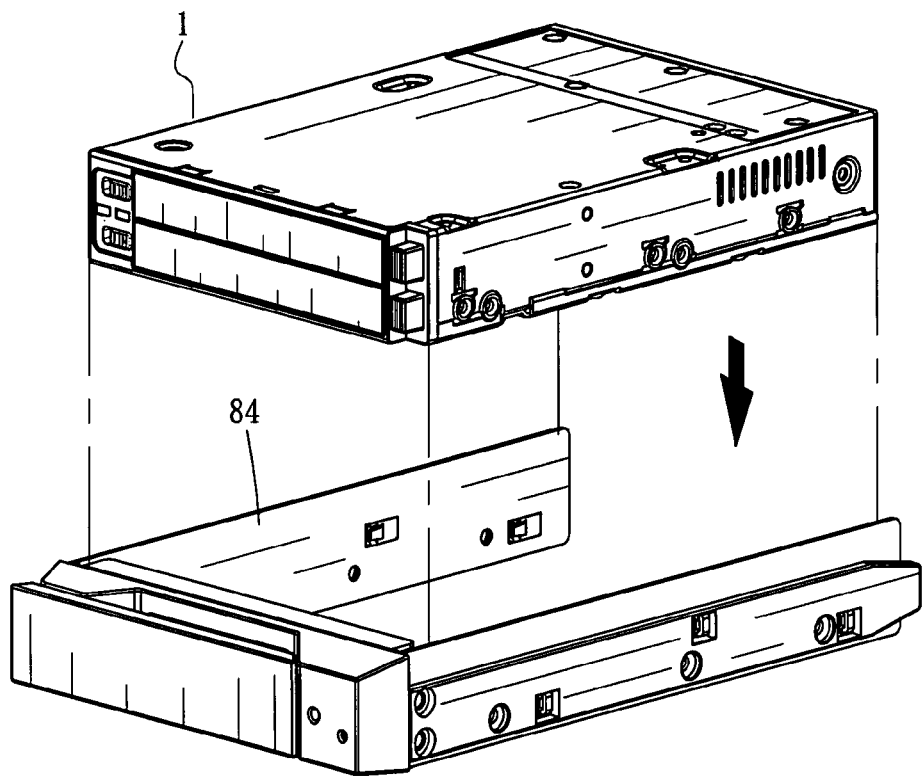
FIG. 6 is a perspective view of the preferred embodiment according to the present invention with support rails added.
Figure 7:
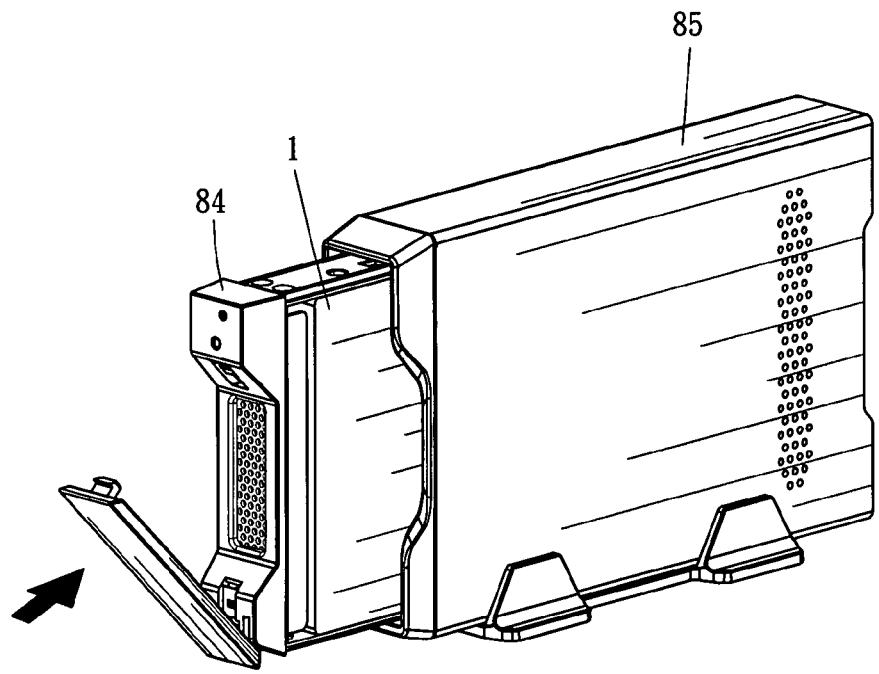
FIG. 7 is a perspective view of the preferred embodiment according to the present invention with support rails added.

The structure of the RAID module 1 converted from a 2.5-inch specification to a 3.5-inch specification according to the invention, as shown in FIG. 6, can be combined with the support rails 84 for being deposed within the 5.25-inch disk drive slot 91 to serve as a 3.5-inch SATA hard disk constructed by two 2.5-inch hard disks. As shown in FIG. 7, a support stand 85 can also be further equipped so that the RAID module 1 may serve as a 3.5-inch SATA external disk drive which includes two 2.5-inch hard disks. Accordingly, there are diverse applications for the converted 3.5-inch disk drive.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A RAID module converted from a 2.5-inch specification to a 3.5-inch specification, characterized in that two 2.5-inch hard disks are installed in two respective hard disk holders within a 3.5-inch SATA RAID module, so as to form a RAID having two hard disks or two stand-alone SATA hard disks, and to fix said 3.5-inch RAID module having two 2.5-inch hard drives within the 3.5-inch disk drive slot or the floppy disk slot of a common computer housing, or to combine with a support rail for mounting said RAID module within a 5.25-inch disk drive slot, or to add a support stand to become an external disk drive, a push rod module having two push rods extending along a first side of two sides of said RAID module, two push rod buttons located on the first side of the two sides of said RAID module, each push rod button configured to separately laterally shift a respective push rod to push out said respective hard disk holder when said push rod button is depressed.

2. A RAID module converted from a 2.5-inch specification to a 3.5-inch specification according to claim 1, wherein a lock key is set on a second of the two sides of said 3.5-inch SATA RAID module, so as to provide a locking mechanism for said hard disk holder.

* * * * *